United States Patent [19]

Old

[11] Patent Number: 4,793,207
[45] Date of Patent: Dec. 27, 1988

[54] PEDAL ACTUATORS

[75] Inventor: John L. Old, Kenilworth, England

[73] Assignee: Massey-Ferguson Services N.V., Curacao, Netherlands Antilles

[21] Appl. No.: 55,268

[22] Filed: May 29, 1987

[51] Int. Cl.⁴ ............................................. G05G 5/06
[52] U.S. Cl. ...................................... 74/532; 74/512; 74/513; 74/527; 74/710.5
[58] Field of Search ................ 74/512, 513, 531, 532, 74/529, 527, 710.5, 478, 478.5

[56] References Cited

U.S. PATENT DOCUMENTS

| | | | |
|---|---|---|---|
| 3,411,376 | 11/1968 | Weber et al. | 74/527 |
| 3,727,481 | 4/1973 | Nicholson | 74/516 |
| 3,897,694 | 8/1975 | Hirst | 74/516 |
| 3,938,407 | 2/1976 | Nisbet | 74/516 |
| 3,975,972 | 8/1976 | Muhleck | 74/512 |
| 4,069,722 | 1/1978 | Derrick | 74/516 |
| 4,399,901 | 8/1983 | Kobayashi et al. | 74/512 |
| 4,513,276 | 4/1985 | Kubota et al. | 180/70.1 |
| 4,584,899 | 4/1986 | Old et al. | 74/710.5 |
| 4,723,933 | 2/1988 | Marto | 74/527 |

FOREIGN PATENT DOCUMENTS

| | | | |
|---|---|---|---|
| 936971 | 11/1955 | Fed. Rep. of Germany | 74/516 |
| 2166130 | 3/1973 | Fed. Rep. of Germany | 74/512 |
| 0011836 | 1/1986 | Japan | 74/512 |
| 0572615 | 9/1977 | U.S.S.R. | 74/512 |
| 531026 | 12/1940 | United Kingdom | 74/516 |

Primary Examiner—Richard E. Moore
Assistant Examiner—Vinh Luong

[57] ABSTRACT

A pedal actuator in which a pedal 10 is movable by the application of foot pressure between raised and depressed positions to actuate a device such as a vehicle differential lock 11 via an operating device 12,13,14,16. The pedal is biased towards its raised position, and a holding device 24 is provided for maintaining the pedal in its depressed position. The holding device comprises a cam follower 33 connected with the operating means for co-movement therewith and a cam 32 for co-operation with the follower. The cam includes a first cam path 34 along which the follower 33 is moved as the pedal is moved from its raised to its depressed position, a holding position 35 in which the cam follower is held by the bias 21 to hold the pedal it its depressed position, and a second cam path 36 along which the follower moves under the action of the bias as the pedal rises from its depressed position to its raised position. A pivotable bridging member 37 is movable by the follower 33 to bridge a gap 38 in the first cam path 34 when the pedal is depressed from its raised position and is moveable by the follower on its way back along the second cam path 36 to allow the follower 33 to return via the gap 38 to its position corresponding to the raised position of the pedal 10.

4 Claims, 3 Drawing Sheets

PEDAL ACTUATORS

This invention relates to pedal actuators and in particular to such actuators for use in operating differential locks for vehicles such as tractors.

Traditionally differential locks on tractors are brought into operation by depressing a pedal and the pedal must be held depressed by the tractor operator for as long as the operator wishes to retain the differential lock in engagement. This can be a tiring operation for the operator when the tractor is required to operate for long periods with a differential lock engaged. Various pedal arrangements have been proposed in the past to alleviate this problem by providing a means for holding the pedal in its depressed position. However, these arrangements have suffered from one or more of a variety of problems including high cost, lack of long term reliability, difficulty in releasing the pedal from its depressed position, and a general lack of positive feel in use.

It is an object of the present invention to provide a simple and efficient pedal actuator which mitigates the above problems and which is suitable for use in actuating a device such as tractor differential lock.

Thus according to the present invention there is provided a pedal actuator comprising a pedal movable by the application of foot pressure between raised and depressed positions to actuate a device, operating means connecting the pedal with the device, bias means operative to bias the pedal towards its raised position, and a holding device for maintaining the pedal in its depressed position, the pedal actuator being characterised in that the holding device comprises a cam follower connected with the operating means for co-movement therewith, cam means for co-operation with the follower and comprising a first cam path along which the follower is moved as the pedal is moved from its raised to its depressed position, a holding position in which the cam follower is held by the bias means to hold the pedal in its depressed position, a second cam path along which the follower moves under the action of the bias means as the pedal rises from its depressed position to its raised position, and a pivotable bridging member which is movable by the follower to bridge a gap in the first cam path when the pedal is depressed from its raised position and which is movable by the follower on its way back along the second cam path to allow the follower to return via the gap to its position corresponding to the raised position of the pedal.

Such a pedal actuator is particularly suitable for use in operating a tractor differential lock with the differential lock being arranged to be held in operation when the pedal is held in its depressed position.

Conveniently the cam means is formed in a block of plastics material and the follower is connected with the operating means by one or more links.

Frequently vehicle differential locks are of a type, hereinafter referred to as being of the type specified, in which two sets of inter-engageable formations (for example teeth) must be engaged to lock together two parts of the differential which normally rotate relative to each other during differential action, and a differential lock actuating member is provided to move one or both sets of formations to effect this locking of the differential.

The present invention also provides an operating system for a differential lock of the type specified, said operating system including a pedal actuator of the form described above in which the raised and depressed positions of the pedal correspond to the disengaged and engaged conditions of the differential lock respectively.

The operating means may include a spring-powered lost motion device enabling, by deformation of the spring, the pedal to be moved to and held in its depressed position even when engagement of the differential lock is prevented by non-alignment of the two sets of locking formations of the differential lock, the energy stored in the spring of the lost-motion device then enabling the displacement of the actuating member and thus the engagement of the locking formations as soon as the formations are in engageable alignment.

It will be appreciated that the above spring-powered lost-motion device enables the tractor operator to depress the pedal and then rely on the energy stored in the spring of the lost-motion device to engage the differential lock as soon as the locking formations are aligned for inter-engagement.

One embodiment of the present invention will now be described, by way of example, only, with reference to the accompanying drawings in which.

Figure 1:
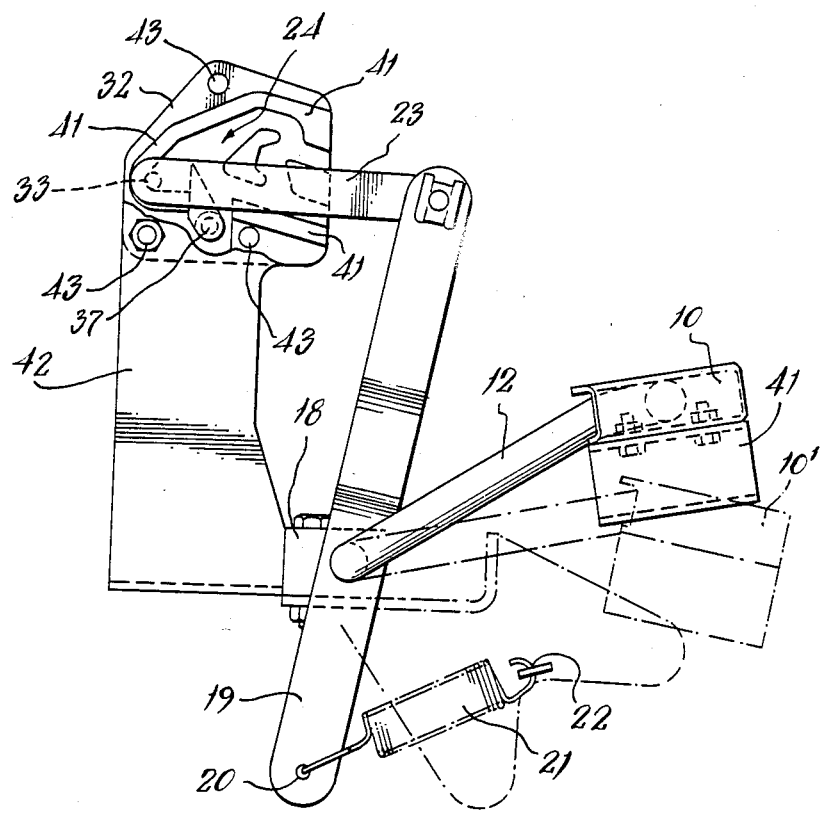
FIG. 1 shows an end side view of a pedal actuator arrangement embodying the present invention used as a tractor differential lock control pedal, the pedal actuator being shown in its raised position.

The pedal actuator comprises a pedal 10 connected with a tractor differential locking mechanism (shown diagramatically in FIG. 2 at 11) by an operating means in the form of of a cranked pedal arm 12, a casting 13 which includes a spring-powered lost-motion device 14 and which is pinned to the arm 12 at 15, and an operating rod 16. The rod 16 is connected with a differential lock actuating member in the form of a selector fork 17. The pedal is mounted on the tractor for pivoting about axis A—A via a nylon block 18.

A link 19 is welded to the arm 12 to provide an attachment point 20 for a return spring 21 which acts between the link 19 and a fixed point 22 on the tractor so as to tend to return the pedal to its raised position shown in FIG. 1.

The other end of link 19 is connected with a further link 23 which connects the arm 12 with a pedal holding device 24 in accordance with the present invention supported on a sheet metal bracket 42. The purpose of the holding device is to enable the pedal 10 to be locked in its depressed position 10' in which the arm 12 and casting 13 have been moved to a position for the engagement of the differential locking mechanism 11.

Figure 2:
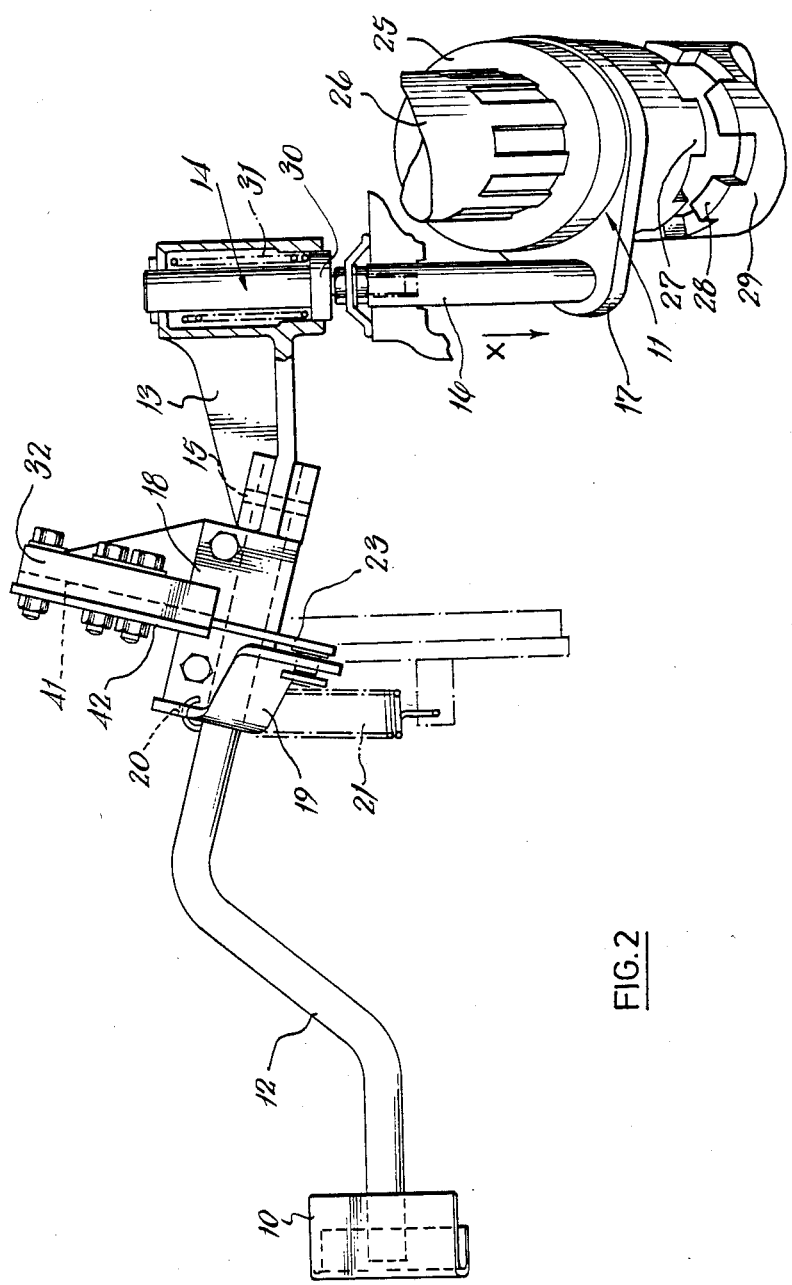
FIG. 2 shows a plan view of the pedal actuator of FIG. 1 with the associated differential lock shown diagrammatically.

In the example illustrated diagramatically in FIG. 2 the differential locking mechanism is in the form of a sleeve 25 splined onto a shaft 26 which carries a differential pinion gear. Sleeve 25 has teeth 27 which are engageable with corresponding teeth 28 provided on part of a support 29 for the crown-wheel of the differential.

Thus in order to engage the differential lock it is necessary to move the operating rod 16 in the direction X of FIG. 2 to engage teeth 27 and 28. This is achieved by depressing the pedal 10 which pivots the arm 12 about axis A—A and causes plunger 30 of lost motion device 14 to press on and move the operating rod 16 to engage teeth 27 and 28. If the teeth 27 and 28 are not aligned for engagement so that rod 16 cannot be moved by plunger 30 the movement of arm 12 and casting 13 resulting from depression of the pedal 10 results in compression of spring 31 within casting 13 and the energy stored in spring 31 is then used to move rod 16 when the teeth 27 and 28 are aligned.

Figure 3:
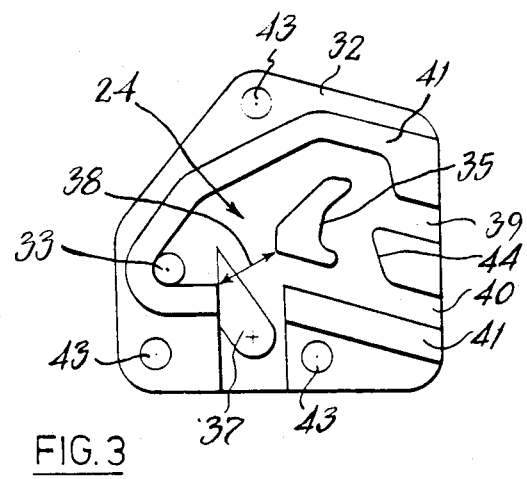
FIG. 3 shows part of the pedal holding device of the present invention in more detail.

Referring to FIG. 3 the holding device 24 comprises cam means formed in plastics block 32 for co-operation with a cam follower in the form of a pin 33 on the end of link 23. The cam means has a first cam path mapped out by the dotted line 34 of FIG. 4 and along with the follower moves as the pedal is depressed from its raised position (corresponding to the follower position 33B of FIG. 4) towards its depressed position (corresponding to the follower position 33C of FIG. 4). The cam means includes a holding position 35 within which the follower 33 is held by the action of the bias spring 21 to hold the pedal 10 in its depressed position. When pedal is released from its depressed position, which is achieved by applying downward pressure to the pedal, the follower travels along a second cam path mapped out by the dotted line 36 in FIG. 5 under the action of spring 21 back towards position 33B.

Figure 4:
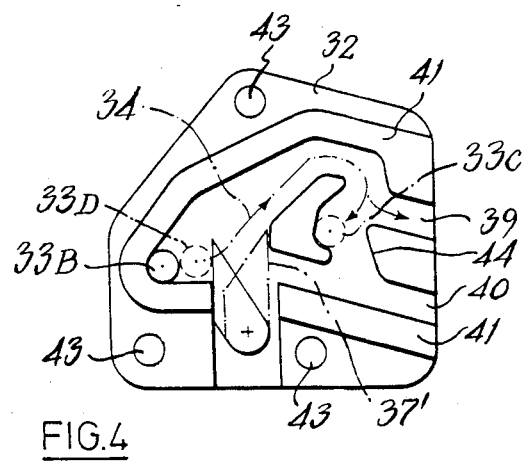
FIGS. 4 and 5 show the operating sequence of the holding device.
Figure 5:
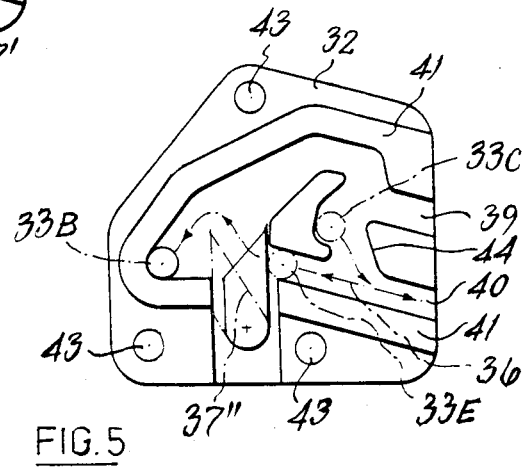

As will be evident from FIGS. 4 and 5, the first and second cam paths are partially defined by a pivotable bridging member 37. As the follower moves from position 33B towards position 33C (see FIG. 4) the follower contacts the bridging member 37 at position 33D and pivots the member to the dotted line position 37' of FIG. 4 to bridge a gap 38 in the cam path. In a similar manner when the follower reaches position 33C on its return journey along the second cam path 36 the follower pivots the bridging member back to the dotted position 37" in FIG. 5 to allow the follower 33 to move through gap 38 to return to position 33B corresponding to the raised position of the pedal.

It will also be observed from FIGS. 3 to 5 that the cam means has two extensions 39 and 40 to the first and second cam paths respectively to ensure that the follower is able to move to a position below the holding position 35 to ensure correct engagement and disengagement of the holding means. A stop is provided to ensure that the follower 33 does not exit from the open end of either of the extensions 39 and 40. For example, a stop member 41 may be bolted to the bottom of pedal 10 which will engage the tractor floor or footplate to limit the downward movement of pedal 10 and thus the movement of link 23 and follower 33.

The plastics block 32 has a stepped level 41 (best seen in FIG. 1) surrounding the cam paths 34 and 36 to accommodate the thickness of the link 23 as the follower and the link move along the cam paths 34 and 36. The block 32 is bolted to support bracket 42 by bolts 43. Bracket 42 also acts as an end plate to close-off cam paths 34 and 36 and to retain link 23 and follower 33 in position in block 32.

Thus when the tractor operator wishes to engage the differential locking mechanism 11 he fully depresses the pedal 10. This causes the plunger 30 to press on operating rod 16 to engage the differential locking mechanism and takes the follower 33 along the first cam path 34 and into the path extension 39 as described above. When the operator removes his foot pressure from the pedal 10 the return spring 21 takes the follower 33 into the holding position 35 thus holding the pedal in its depressed position 10'. Thus the differential locking mechanism is maintained in its operative condition.

To release the differential locking mechanism the operator presses on the pedal 10 whilst it is in its depressed position which moves the follower out of the holding position 35 into contact with angled surface 44 which defines part of the second cam path 36 and thence into path extension 40. The operator then removes his foot pressure from pedal 10 and the pedal then rises to its raised position with the follower 33 moving along second cam path 36 to position 33B via gap 38 as described above.

The present invention thus provides a simple but efficient pedal acutator which is particularly suitable for use in actuating a tractor differential lock.

I claim:

1. A pedal actuator comprising a pedal movable by the application of foot pressure between raised and depressed positions, an operating means connected with the pedal and operable to actuate a device as the pedal is moved between its raised and depressed positions, bias means operative to bias the pedal towards its raised position, and a holding device for maintaining the pedal in its depressed position, the holding device comprising a cam follower connected with the operating means for co-movement therewith, cam means for co-operation with the follower and comprising a first cam path along which the follower is moved as the pedal is moved from its raised to its depressed position, a holding position in which the cam follower is held by the bias means to hold the pedal in its depressed position, a second cam path along which the follower moves under the action of the bias means as the pedal rises from its depressed position to its raised position, and a pivotable bridging member which is movable by the follower to bridge a gap in the first cam path when the pedal is depressed from its raised position and which is movable by the follower on its way back along the second cam path to allow the follower to return via the gap to its position corresponding to the raised position of the pedal.

2. A pedal actuator according to claim 5 in which the cam means is formed in a block of plastics material.

3. The combination of a pedal actuator according to claim 1 and a device in the form of a differential lock in which the raised and depressed positions of the pedal correspond to the disengaged and engaged conditions of the differential lock.

4. The combination of claim 3 in which the differential lock includes two sets of inter-engageable locking formations which must be engaged to lock together two parts of the differential which normally rotate relative to each other during differential action and in which the operating means includes a spring-powered lost motion device, the lost motion device enabling, by deformation of the spring, the pedal to be moved to and held in its depressed position even when engagement of the differential lock is prevented by non-alignment of the two sets of locking formations, the energy stored in the spring of the lost-motion device then enabling the displacement of the actuating member and thus the engagement of the locking formation as soon as the formations are in engageable alignment.

* * * * *